United States Patent [19]

Barényi et al.

[11] 3,728,537
[45] Apr. 17, 1973

[54] ARRANGEMENT OF FRONT AND/OR REAR LIGHTS OF MOTOR VEHICLES

[75] Inventors: Béla Barényi, Maichingen; Hermann Renner, Boblingen; Bruno Sacco, Sindelfingen, all of Germany

[73] Assignee: Daimler-Benz Aktiengesellschaft, Stuttgart-Unterturkheim, Germany

[22] Filed: Aug. 25, 1969

[21] Appl. No.: 852,751

[30] Foreign Application Priority Data

Aug. 28, 1968 Germany...............P 17 80 299.2

[52] U.S. Cl....................................240/7.1, 296/137
[51] Int. Cl. ..............................................B60q 3/00
[58] Field of Search.............................240/7.1, 8.2; 296/28, 46, 137; D14/3

[56] References Cited

UNITED STATES PATENTS

| 2,086,524 | 7/1937 | Clark | 240/8.2 |
|---|---|---|---|
| 2,576,354 | 11/1951 | Oswald | 296/137 |
| 2,891,140 | 6/1959 | Huff | 240/7.1 |
| 2,937,047 | 5/1960 | Heller, Jr. et al. | 296/28 |
| 2,986,423 | 5/1961 | Barényi | 296/28 |
| 3,008,760 | 11/1961 | Barényi | 296/137 |
| 3,015,519 | 1/1962 | Barényi | 296/137 |
| 3,093,406 | 6/1963 | Barényi | 296/46 |
| R169,365 | 4/1953 | Fageol | D 14/3 |
| 2,523,104 | 9/1950 | Emmert | 296/137 R |
| 2,955,872 | 10/1960 | Barényi | 296/28 R |

FOREIGN PATENTS OR APPLICATIONS 1,405,203  3/1969  Germany.............................296/137

*Primary Examiner*—Louis J. Capozi
*Attorney*—Craig, Antonelli & Hill

[57] ABSTRACT

An arrangement for the front and/or rear lights of motor vehicles in which longitudinal bearers are provided within the area of the lateral edges of the roof which accommodate in the front and rear end faces thereof the front and/or rear lights of the vehicle.

24 Claims, 10 Drawing Figures

PATENTED APR 17 1973

INVENTORS
BELA BARENYI
HERMAN RENNER
BRUNO SACCO

BY *Craig, Antonelli, Stewart & Hill*
ATTORNEYS

ARRANGEMENT OF FRONT AND/OR REAR LIGHTS OF MOTOR VEHICLES

The present invention relates to an arrangement of the front and/or rear lights of motor vehicles, especially of passenger motor vehicles.

The front and rear lights of motor vehicles, especially of passenger motor vehicles are secured customarily approximately at half the vehicle height on the front and rear parts of the body. The lights are thereby mounted as a rule at the front and rear fenders. This arrangement entails the disadvantage that the lights by reason of their low arrangement can be readily soiled and covered by the dirt stirred up by the vehicle so that the lighting effect thereof is strongly impaired. Additionally, it is disadvantageous with such prior constructions that the lights are located directly in the ground areas of the vehicle because the lights are likely to be destroyed in such areas already in case of minor collisions.

The present invention aims at creating an arrangement of the aforementioned type in which the lights are better protected against soiling and damages and in which the lights at the same time achieve still a better illumination. The present invention essentially consists in that longitudinal bearers are provided within the area of the lateral edges of the roof which extend over the length of the roof and accommodate in the end faces the front and/or rear lights. The lights thus arranged are well circumcirculated by the driving air so that a certain cleaning effect is achieved thereby. Additionally, as a result thereof, the lights are also arranged outside of the area which is frequently damaged in the event of small collisions. Furthermore, by the use of longitudinal bearers, a considerable reinforcement of the roof results which, on the one hand, contributes to the increase of the internal safety of the motor vehicle and, on the other, can be utilized to use the roof directly as loading surface.

In order to enable favorable streamline or flow conditions within the area of the front lights, the front end faces of the longitudinal bearers disposed within the area of the windshield may have an inclination corresponding to the inclination of the windshield. It is appropriate for keeping clean the rear lights, if the end faces of the longitudinal bearers disposed within the area of the rear window extend approximately vertically.

In order not to change the heretofore customary over-all impression and appearance of a motor vehicle, the longitudinal bearers may be arranged on the inside of a roof surface of a double-shell or double-wall roof. However, in order to achieve that the lights are circumcirculated by the air at least on three sides, it is advantageous if the longitudinal bearers project above the roof surface. This entails additionally the advantage that the longitudinal bearers can then serve as lateral boundaries of the roof utilizable as loading surface.

In order to render the vehicle readily visible from the side during night driving, the longitudinal bearers may be advantageously provided additionally with further lights at the outer lateral surfaces thereof.

Accordingly, it is an object of the present invention to provide a front and/or rear light arrangement for motor vehicles which avoids by simple means the aforementioned shortcomings and drawbacks encountered by the prior art constructions.

Another object of the present invention resides in an arrangement for the front and/or rear lights of motor vehicles which greatly reduces the soiling thereof while at the same time increasing their protection against damages in case of minor collisions.

A further object of the present invention resides in an arrangement for the front and/or rear lights of motor vehicles which not only increase the lighting effect but additionally result in increased rigidity of the roof, thereby contributing to the safety of the passengers in the vehicle.

Still another object of the present invention resides in an arrangement for the front and/or rear lights of motor vehicles which permits the use of the roof surface directly as a loading surface.

These and further objects, features, and advantages of the present invention will become more obvious from the following description when taken in connection with the accompanying drawing which shows, for purposes of illustration only, several embodiments in accordance with the present invention, and wherein.

Figure 1:
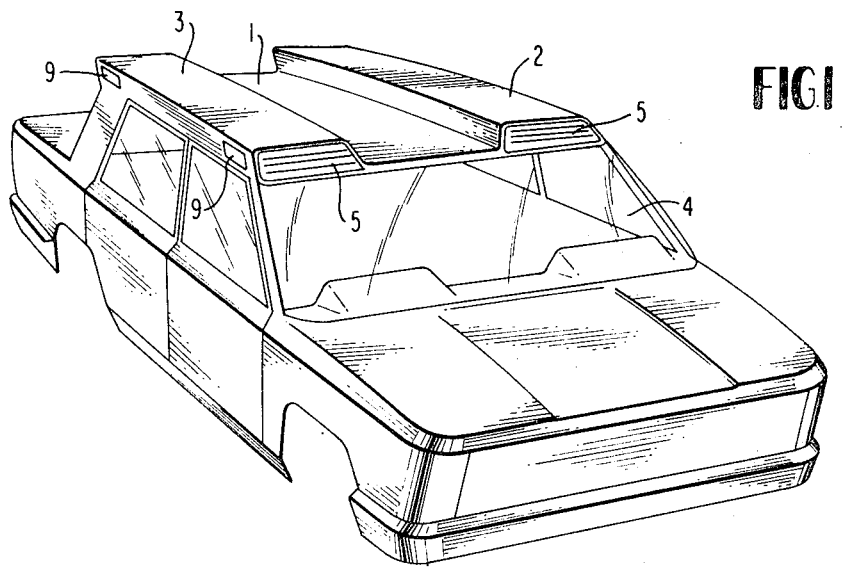
FIG. 1 is a perspective front view of a passenger motor vehicle equipped with front lights in accordance with the present invention.
Figure 2:
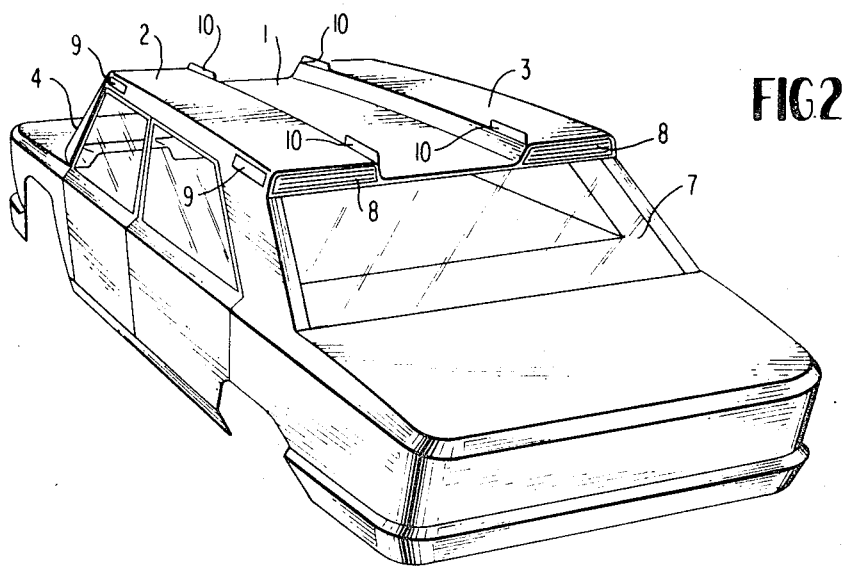
FIG. 2 is a perspective rear view of the passenger motor vehicle according to FIG. 1.

Referring now to the drawing wherein like reference numerals are used throughout the various views to designate like parts, and more particularly to FIGS. 1 and 2, the motor vehicle illustrated in these Figures is equipped within the area of the lateral edges of the roof 1 with two longitudinal bearers 2 and 3 constructed as hollow bearers, which extend over the entire roof length and which, as shown in FIG. 1, accommodate in the front end faces thereof disposed within the area of the windshield 4, the front lights 5 whereas, as shown in FIG. 2, they accommodate in the end faces thereof disposed within the area of the rear window 7 the rear lights 8. A thus equipped vehicle is able to illuminate better the road disposed in front thereof by means of its front lights 5 without causing a greater blinding danger. Additionally, the vehicle can be recognized earlier as a result of the high arrangement of the rear lights 8, especially at hill tops-or the like or in case of break-downs, etc. In such a light arrangement, also the electrical installation is arranged in an advantageous manner, protected on the inside of the longitudinal bearers 2 and 3 and no longer exposed in the open engine space so that the danger of a corrosion is reduced. In order to construct the vehicle so as to be readily visible also from the side, the outer lateral surfaces of the longitudinal bearers 2 and 3 are equipped additionally with further lights 9.

Therebeyond, the roof constructed with the two longitudinal bearers 2 and 3 can be utilized directly as loading surface by reason of its high stability and strength. In the event, as illustrated in the embodiment according to FIGS. 1 and 2, the longitudinal bearers 2 and 3 project above the roof surface, they may also serve additionally as lateral boundaries for the luggage pieces to be placed thereon. Securing brackets 10 (FIG. 2) for the mounting or securing of the parts retaining the luggage pieces may thereby be additionally provided. Additionally, the roof reinforcement by means of two longitudinal bearers 2 and 3 further contributes to the increase of the interior safety because a very rigid roof 1 is achieved thereby which contributes to protect the passenger space as much as possible against deformations in case of accidents.

In order to protect the lights 5 and 8 against dirt deposits, the end faces of the longitudinal bearers 2 and 3 may be appropriately so arranged within the area of the windshield 4 that the inclination thereof corresponds to the inclination of the windshield 4. As a result thereof, particularly favorable flow conditions are created. Within the area of the rear window, in contradistinction thereto, it is favorable for the same purpose if the end faces of the longitudinal bearers 2 and 3 accommodating the rear lights 8 extend approximately vertically.

Figure 3:
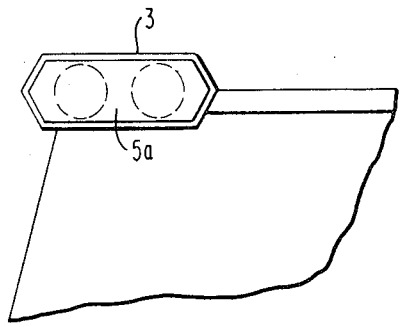
FIG. 3 is a schematic partial end view of a front light in accordance with the present invention, the other half of the vehicle being of symmetrical construction.
Figure 3A:
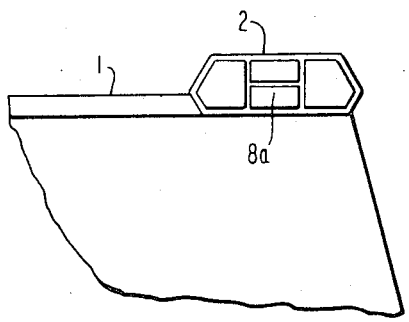
FIG. 3a is a schematic partial end view of a rear light in accordance with the present invention, the other half being again of symmetrical construction.

In the embodiments as illustrates in FIGS. 3 and 3a, in which the longitudinal bearers 2 and 3 project above the roof surface, the lights 5a and 8a are circumcirculated on three sides thereof. A dual headlight may thereby serve corresponding to FIG. 3, for example, as front light 5a whereas corresponding to FIG. 3a a multi-chamber light may be used as rear light 8a which is inserted into the rear end face of the longitudinal bearers 2 and 3.

Figure 4:
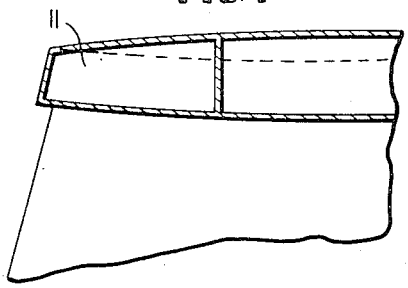
FIGS. 4, 5, 6, 7, 8, and 9 are schematic partial end views illustrating various possible roof shapes in accordance with the present invention, the other half of the roof being always of symmetrical construction.
Figure 5:
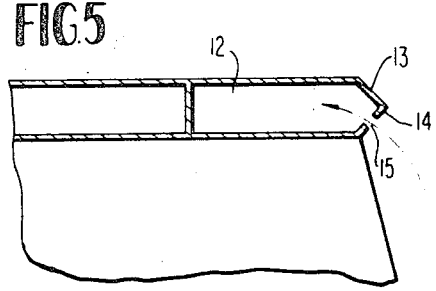

In FIGS. 4 and 5, embodiments are illustrated in which longitudinal bearers 11 and 12 are provided; however, the heretofore customary shapes of vehicle roofs are not changed. As shown in FIG. 4, the roof may be curved convexly or, as illustrated in dash line, can be curved slightly concavely. As illustrated in FIG. 5, the roof may also be constructed flat. FIG. 5 illustrates additionally that the longitudinal bearers may also be utilized in an advantageous manner for the ventilation of the vehicle interior space in that they are equipped with inclined lateral boundary surfaces 13 and 14 which are provided in the downwardly directed surfaces with corresponding ventilating apertures 15 for the in-flow and out-flow of air.

Figure 6:
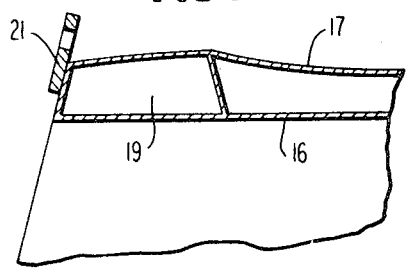
Figure 7:
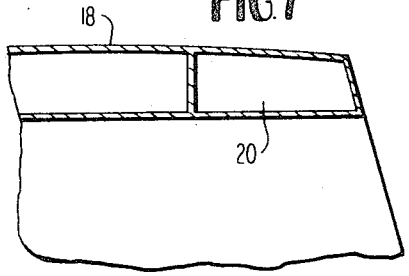

As shown in FIGS. 6 and 7, also a double-shell or double-wall roof construction may be provided in which the inner roof panel 16 no longer extends parallel to the outer roof panels 17 and 18. The inner roof panel 16, which is constructed flat in the illustrated embodiment, is connected with the upper roof panels 17 and 18 by means of the two longitudinal bearers 19 and 20; corresponding to FIG. 7 the roof panel 18 may again be constructed convex or, corresponding to FIG. 5, it may have a concave curvature 17 between the longitudinal bearers 19 and 20. This concave curvature is particularly advantageous as regards strength and loadability of the roof. Additionally, securing brackets 21 may be mounted at the longitudinal bearers 19 and 20, at which the retaining means for the luggage pieces can be secured, by means of which the roof can be directly loaded.

Figure 8:
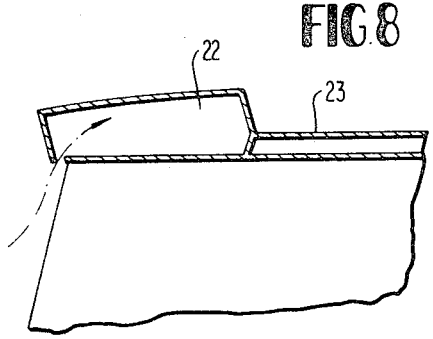
Figure 9:
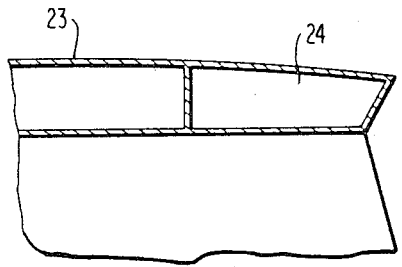

In the embodiment according to FIG. 8, the illustrated longitudinal bearer 22 projects laterally beyond the vehicle so that its bottom side projecting beyond the vehicle can be utilized for the purpose of ventilation of the vehicle passenger space. The outer sheet metal panel 23 may be arranged thereby either in such a manner that a step-shaped offset is created (FIG. 8) or, corresponding to FIG. 9, it can be arranged in the same surface as the top side of the longitudinal bearer 24.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:

1. A structural arrangement for accommodating light means on motor vehicles of the type having roof means over a passenger compartment of the vehicle; said arrangement comprising:

two longitudinally extending longitudinal bearer means for structurally reinforcing said roof means, said bearer means being located adjacent opposite lateral edges of the roof means and extending longitudinally substantially along the length of the roof means, each of said bearer means having a rearwardly facing surface at a rear end portion thereof and a forwardly facing surface at a forward end portion thereof, and hollow section portions formed immediately adjacent the respective facing surfaces in at least one of the rear and forward end portions of the bearer means for accommodating light means.

2. An arrangement according to claim 1, wherein hollow section portions for accommodating light means are formed in both the rear and forward end portions of the bearer means.

3. An arrangement according to claim 2, wherein said bearer means extends parallel to one another in the longitudinal direction along respective right and left lateral edges of the roof means.

4. An arrangement according to claim 2, further comprising an inclined vehicle windshield connected to a front edge portion of said roof means and in that the forwardly facing surfaces of said bearer means have an inclination corresponding to the inclination of the windshield.

5. An arrangement according to claim 4, further comprising a rear vehicle window connected to a rear edge portion of said roof means, and wherein the rearwardly facing surfaces of said bearer means extend approximately vertically.

6. An arrangement according to claim 5, characterized in that said bearer means include securing brackets for securing luggage to the roof means of the vehicle.

7. An arrangement according to claim 5, wherein said roof means includes two roof shells, and wherein the longitudinal bearer means are disposed inside of one of said roof shells.

8. An arrangement according to claim 5, wherein said roof means includes an upper roof surface portion, and wherein the longitudinal bearer means project above said upper roof surface portion.

9. An arrangement according to claim 5, wherein each of said longitudinal bearer means include laterally outwardly facing surfaces extending along outer lateral edge portions of said longitudinal bearer means, and further comprising further hollow section portions formed immediately adjacent said laterally facing surfaces in said lateral edge portions for accommodating further light means.

10. An arrangement according to claim 5, wherein the longitudinal bearer means includes laterally projecting portions which project laterally beyond the lateral edges of the roof means, and wherein ventilating aperture means are provided in the laterally projecting portions.

11. An arrangement according to claim 5, wherein each of said longitudinal bearer means are of hollow construction and include a laterally outwardly facing side section formed by a planar upwardly and outwardly extending first wall member and a planar upwardly and inwardly extending second wall member, wherein said first and second wall members are connected to one another along the top edge portion of said first wall member and a bottom edge portion of said second wall member, and wherein ventilating aperture means are provided in said first wall member for introducing ventilating air into said longitudinal bearer means.

12. An arrangement according to claim 10, wherein said laterally projecting portions include bottom surface portions, and wherein said ventilating aperture means extend through said bottom surface portions.

13. An arrangement according to claim 5, wherein the roof means includes outer surface portions which form an offset corresponding in shape to the outer configuration of the bearer means.

14. An arrangement according to claim 1, further comprising an inclined vehicle windshield connected to a front edge portion of said roof means, and wherein the forwardly facing surfaces of the bearer means are located within the area of the plane of the vehicle windshield and have an inclination substantially corresponding to that of the windshield.

15. An arrangement according to claim 1, further comprising a vehicle rear window connected to a rear edge portion of said roof means, and wherein the rearwardly facing surfaces of the bearer means are disposed within the area of the plane of the vehicle rear window and extend approximately vertically.

16. An arrangement according to claim 1, wherein said roof means includes two roof shells, and wherein the longitudinal bearer means are disposed inside of one of said roof shells.

17. An arrangement according to claim 1, wherein said roof means includes an upper roof surface portion, and wherein the longitudinal bearer means project above said upper roof surface portion.

18. An arrangement according to claim 1, wherein each of said longitudinal bearer means include laterally outwardly facing surfaces extending along outer lateral edge portions of said longitudinal bearer means, and further comprising further hollow section portions formed immediately adjacent said laterally facing surfaces in said lateral edge portions for accommodating further light means.

19. An arrangement according to claim 18, further comprising a vehicle rear window connected to a rear edge portion of said roof means, and wherein the rearwardly facing surfaces of the bearer means are disposed within the area of the plane of the vehicle rear window and extend approximately vertically.

20. An arrangement according to claim 5, wherein the longitudinal bearer means includes laterally projecting portions which project laterally beyond the lateral edges of the roof means, and wherein ventilating aperture means are provided in the laterally projecting portions.

21. An arrangement according to claim 1, wherein each of said longitudinal bearer means are of hollow construction and include a laterally outwardly facing side section formed by a planar upwardly and outwardly extending first wall member and a planar upwardly and inwardly extending second wall member, wherein said first and second wall members are connected to one another along the top edge portion of said first wall member and a bottom edge portion of said second wall member, and wherein ventilating aperture means are provided in said first wall member for introducing ventilating air into said longitudinal bearer means.

22. An arrangement according to claim 1, wherein said laterally projecting portions include bottom surface portions, and wherein said ventilating aperture means extend through said bottom surface portions.

23. An arrangement according to claim 1, wherein the roof means includes outer surface portions which form an offset corresponding in shape to the outer configuration of the bearer means.

24. An arrangement according to claim 18, further comprising an inclined vehicle windshield connected to a front edge portion of said roof means, and wherein the forwardly facing surfaces of the bearer means are located within the area of the plane of the vehicle windshield and have an inclination substantially corresponding to that of the windshield.

* * * * *